(12) United States Patent
Kuesperth

(10) Patent No.: US 8,887,847 B2
(45) Date of Patent: Nov. 18, 2014

(54) LOUVER FOR A MOTOR VEHICLE RADIATOR

(71) Applicant: Kunststoff Schwanden AG, Ganterschwil (CH)

(72) Inventor: Joseph Kuesperth, Schwanden (CH)

(73) Assignee: Kunststoff Schwanden AG, Schwanden (CH)

( * ) Notice: Subject to any disclaimer, the term of this patent is extended or adjusted under 35 U.S.C. 154(b) by 0 days.

(21) Appl. No.: 13/858,378

(22) Filed: Apr. 8, 2013

(65) Prior Publication Data

US 2013/0270019 A1 Oct. 17, 2013

(30) Foreign Application Priority Data

Apr. 14, 2012 (CH) .................................. 0513/12

(51) Int. Cl.
  *B60K 11/08* (2006.01)
  *B60K 11/04* (2006.01)
  *F16K 1/16* (2006.01)

(52) U.S. Cl.
  CPC ............. *B60K 11/085* (2013.01); *B60K 11/08* (2013.01); *B60K 11/04* (2013.01); *F16K 1/165* (2013.01)
  USPC ........................ 180/68.1; 180/68.2; 180/68.4

(58) Field of Classification Search
  None
  See application file for complete search history.

(56) References Cited

U.S. PATENT DOCUMENTS 7,992,664 B2 * 8/2011 Kiener et al. ................ 180/68.1

FOREIGN PATENT DOCUMENTS

| DE | 3905349 A1 | 9/1989 |
| DE | 4414893 A1 | 9/1995 |
| DE | 100 47 952 A1 | 4/2002 |
| DE | 20 2011 000 392 U1 | 5/2011 |
| EP | 1974974 A1 * | 10/2008 |

OTHER PUBLICATIONS

European Search Report dated Aug. 7, 2013 for EP Application No. 13405034.3.
Espacenet English abstract of DE 100 47 952 A1.
Espacent English abstract of DE 3905349 A1.
Espacenet English abstract of DE 4414893 A1.

* cited by examiner

*Primary Examiner* — J. Allen Shriver, II
*Assistant Examiner* — Hilary L Johns
(74) *Attorney, Agent, or Firm* — Ladas & Parry LLP

(57) ABSTRACT

A servo drive for the set ring of a louver for a motor vehicle has a self-locking gear motor, the output shaft of which is coupled with a control crank. The end of the control crank turned away from the output shaft is connected by way of a link in a toggle-like manner with a positioning rod that is longer by a multiple of its length, of which the end turned away from the control crank is coupled with the set ring. A housing that protects the crank drive extends along the circumference of the set ring and is fastened on the radiator frame together with a servo drive housing.

10 Claims, 2 Drawing Sheets

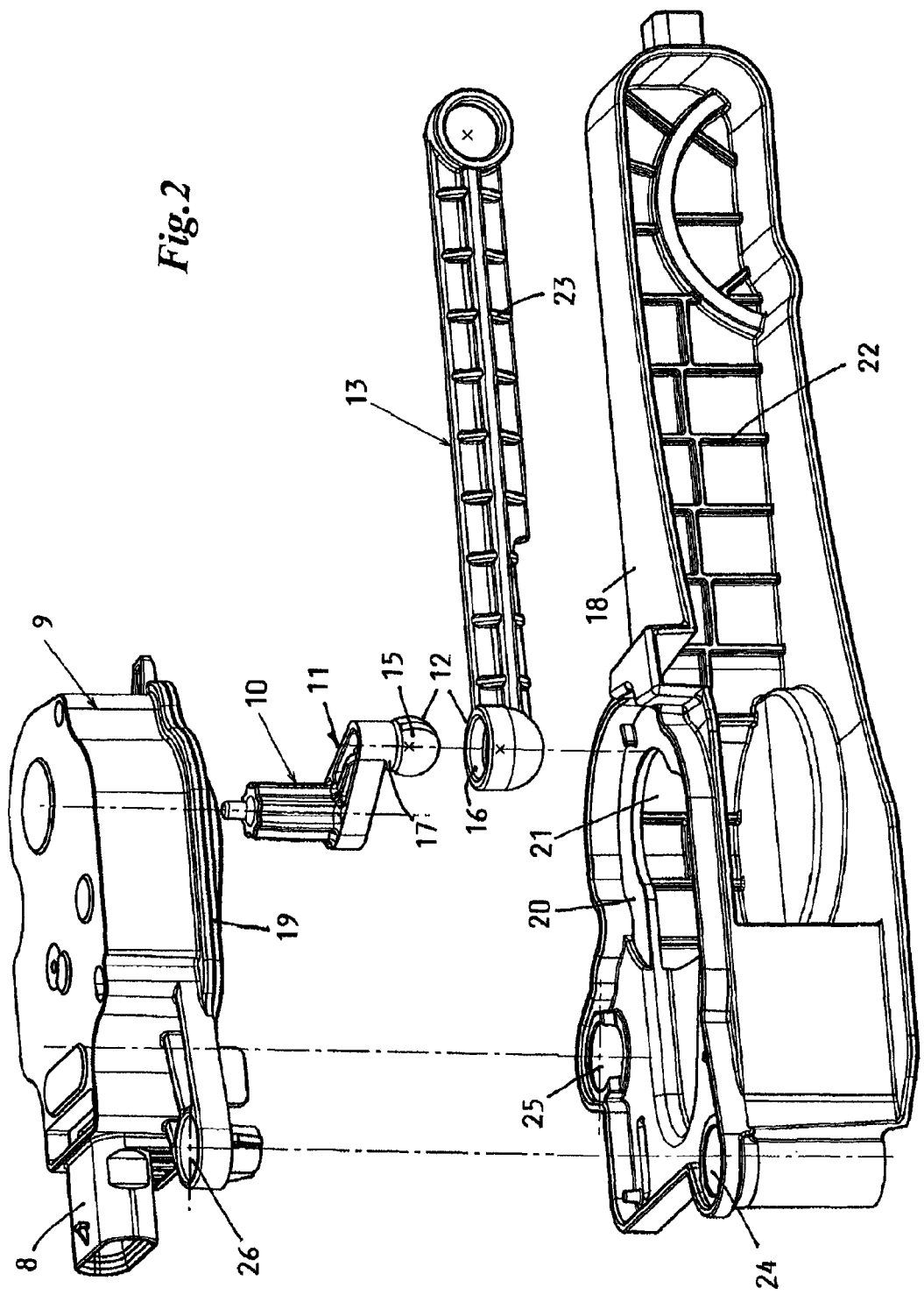

LOUVER FOR A MOTOR VEHICLE RADIATOR

Figure 1:
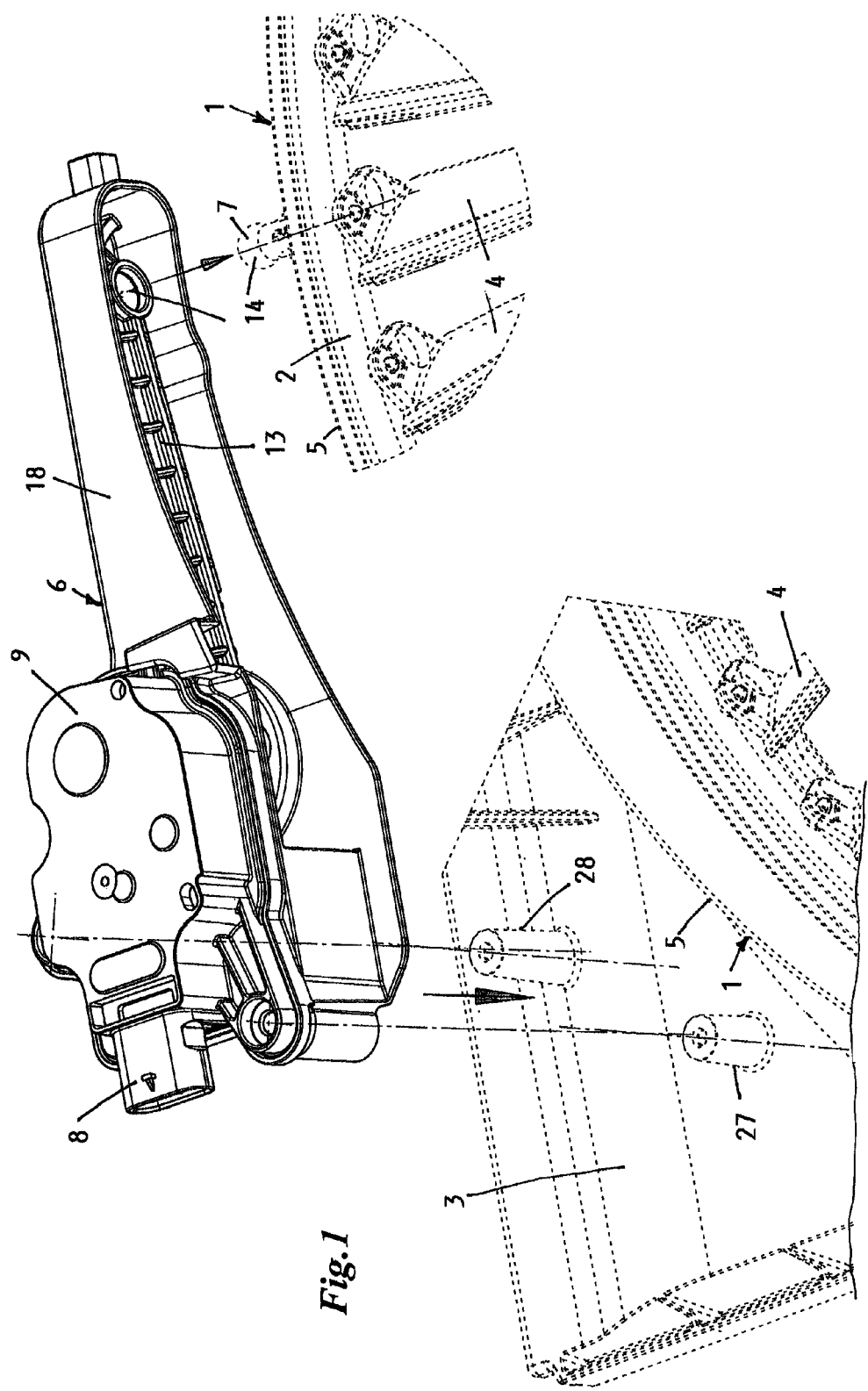

Louver for a motor vehicle radiator with radially arranged fins mounted in a circular channel of a radiator frame so they can be swiveled around its longitudinal axis, which are linked with a set ring surrounding the channel in the area of the radially outer end for performing a swivel motion between an opened and closed position of the louver, whereby the set ring is articulated at one point on its circumference with a positioning rod of a servo drive that is fastened on the radiator frame.

Louvers of this type are known, e.g., through DE3905349, DE 4414893, EP1974974 and U.S. Pat. No. 7,992,664. The use of a vacuum unit suggested there for a servo drive has the disadvantage, among others, that in addition to the technical measures including a vacuum source and vacuum lines, the required vacuum can only be maintained with the engine running, so opening of the louver when the internal combustion engine is shut off improperly and closing for storing the heat of an internal combustion engine that is shut off intentionally cannot be controlled according to the program. It is also disadvantageous that the control force of a vacuum unit is dependent on the size of its diameter so that it requires a correspondingly large installation place on the edge of the louver or on the radiator frame.

From DE 10047952, controlling the motion of the set ring of a louver of the type mentioned at the beginning by means of a short, angle lever arm of a servo motor acting directly on the set ring is also known, in that this engages into a hole in the set ring in order to move the fins of the louver by one-quarter turn from open to closed position of the louver. This control motor must be mounted so it can slide in order to perform a compensating motion and is also coupled with a thermostat.

The invention is based on the object of finding a louver of the type named at the beginning having a servo control with space-saving construction and mounting with high functional reliability and that can exercise high control forces on the set ring. In addition, it will be adaptable to differently dimensioned louvers and their radiator frames using simple manufacturing so it can also replace the previously common vacuum control unit without design changes.

The object of the invention is achieved in that the servo drive has a self-locking gear motor with an output shaft that is coupled with a crank, of which the end that is turned away from the output shaft is connected to a positioning rod with a linkage, of which the end turned away from the crank is coupled to the set ring.

In the following, the invention will be explained in more detail using an exemplary embodiment illustrated in the drawings. In the drawings:

FIG. 1 shows an overall perspective view of the servo drive with areas of the radiator frame and the louver intended for its installation indicated by dotted lines and FIG. 2 shows an exploded view drawing of the servo drive with individual representation of a control motor, its crank, its positioning rod and an adapter housing.

The radiator louver 1 is used for opening and closing a circular air duct 2 adjacent to the radiator of a motor vehicle, which is provided with a radiator frame 3 that is also designated as radiator body. For this, the air duct 2 comprises numerous radially oriented louver fins 4 that can swivel in it.

For performing a swivel movement of the fins 4 used for opening and closing, a set ring 5 is provided that surrounds the air duct 2 and can be slid in its circumferential direction.

The type of effect of the set ring 5 on the fins 4, as well as the complete embodiment of the louver, is described in more detail, for example in EP 1974974.

A coupling element, e.g., in the form of a coupling pin 7 is fastened or formed on the outer circumference of the set ring 5 for coupling with the drive 6 of the louver set ring 5 that is essential to the invention.

The servo drive 6 has a stepper motor supplied by way of an electrical plug-type connection 8, which is enclosed with a series of gear wheels (not shown) in a common flat drive housing 9 so that its output shaft coupled with the crank shaft 10 of a control crank 11 can receive a high torque.

The use of a stepper motor has the advantage that at the start it can calibrate itself so that no sensors are required for recognizing the control position and no stops are required for the end positions of the fins. In addition, malfunctions are recognized so that in fault situations, e.g., during a communication failure with a control unit, the fins of the louver 1 can be moved into an open position. Because of its self-locking characteristics, the servo drive 6 can also stop the fins in an intermediate position for temperature control.

The transfer of the control motion from the control crank 11 to the set ring 5 of the louver occurs by way of a first link 12 provided on its outer end to a positioning rod 13, of which the end that is turned away from this link 12 is coupled with the set ring 5 by way of a second link 14 having the coupling pin 7.

Preferably these two links 12 and 14 are designed as ball joints so that the motion of the positioning rod occurring in two planes perpendicular to each other, i.e., according to the swivel movement of the control crank 11 and the curved path of the set ring 5 can be executed without bending deformations. Here, in each case, a ball head 15 is engaged in a socket 16 and both are designed as a unit with the control crank 11 and/or the positioning rod 13 in plastic injection molding.

The ball head 15 of the first link is preferably provided on one of the short pins 17 oriented opposite the crank shaft 10 of the control crank 11 so the control crank 11 working together with the positioning rod 13 can execute an unimpeded rotary motion in the manner of a toggle. In this case, in addition to controlling a maximum control path by way of the stepper motor, e.g., corresponding to a crank rotation of 180°, this can also be limited by stops provided on the crankshaft housing 18.

This toggle-like motion with a positioning rod 13 that has a length that is a multiple of the length of the control crank 11, in relationship to a control crank 11 that is relatively short according to the maximum control path of the positioning rod 13, leads to high control forces, especially in the two extreme positions of the louver fins and a relatively fast control motion into the intermediate positions of the fin rotary motion.

For example, the length of positioning rod 13 corresponds to 3 to 6 times the length of the control crank 11 so it extends approximately tangentially to the circumference of the set ring 5 and acts on the set ring 5 with an optimally oriented force component. For optimal positioning of the control drive 6 relative to the coupling pin 7 of the set ring 5, the length of the positioning rod 13, including an associated housing 18, can be selected in different ways and be adapted to the respective spatial conditions.

In order to protect the control mechanisms of the louver consisting of the control crank 11 and the positioning rod 13 with their ball joints 12, 14 from dirt or mechanical effects and also to prevent risk when working in the engine compartment of the motor vehicle, this is enclosed in an elongated crank rod housing 18 that is provided in addition to the drive housing 9 of the servo drive 6 and is adapted to the length of the positioning rod 13, which extends along the circumference of the set ring 5.

For simple installation of the servo drive 6 adjacent to the circumference of the set ring 5, a flange connection is provided between the drive housing 9 and the crank rod housing 18, the adjacent flanges 19, 20 of which enclose an opening 21 through which the ball head 15 of the control crank 11 can be brought into engagement with the socket 16 of the positioning rod 13.

For manufacturing the elongated crank rod housing 18 and the positioning rod 13 in plastic injection molding technique in a way that saves material, these have numerous reinforcement ribs 22, 23 in a grid-like arrangement.

For a fastening of the servo drive 6 on the radiator frame 3 that is rigid relative to the set ring 5 capable of rotary motion, two fastening screws that are not shown, which extend through screw channels 24, 25, 26 of the crank rod housing 18 and of the servo drive housing 9 engage with their threads in a mounting pin 27, 28 formed on the radiator frame.

The invention claimed is:

1. Louver for a motor vehicle radiator with radially arranged fins, mounted in a circular channel of a radiator frame so they can be swiveled around their longitudinal axis, which are linked in the area of their radial outer ends with a set ring surrounding the channel for the execution of a swiveling motion between an open and closed position of the louver, wherein the set ring is articulated at one point on its circumference with a positioning rod of a servo drive that is fastened on a radiator frame, wherein the servo drive has a self-locking gear motor, the motor having an output shaft is coupled with a control crank, of which the end that is turned away from the output shaft is connected by way of a link to a positioning rod, of which the end that is turned away from the control crank is coupled with the set ring.

2. Louver according to claim 1, wherein the positioning rod is longer than the control crank by a multiple of its length.

3. Louver according to claim 1, wherein the positioning rod has a length that is three to six times longer than the control crank.

4. Louver according to claim 1, wherein the positioning rod is connected with the set ring by way of a ball joint.

5. Louver according to claim 1, wherein the positioning rod is connected to the control crank by way of a ball joint.

6. Louver according to claim 5, wherein the ball head or the socket of the ball head is provided on a crank pin extending away from the control crank.

7. Louver according to claim 1, wherein between a housing of the servo drive and a crank rod housing, a flange connection is provided, the adjacent flanges of which surround an opening through which the control crank extends.

8. Louver according to claim 7, wherein the crank rod housing and the servo drive housing have screw channels that are coaxial with each other for holding fastening screw engaging in the radiator frame.

9. Louver according to claim 1, wherein the control crank, the positioning rod, and a housing of the positioning rod are formed of plastic in the injection molding process.

10. Louver according to claim 9, wherein the positioning rod and the housing of the positioning rod have numerous reinforcement ribs in a grid-like arrangement.

* * * * *